UNITED STATES PATENT OFFICE.

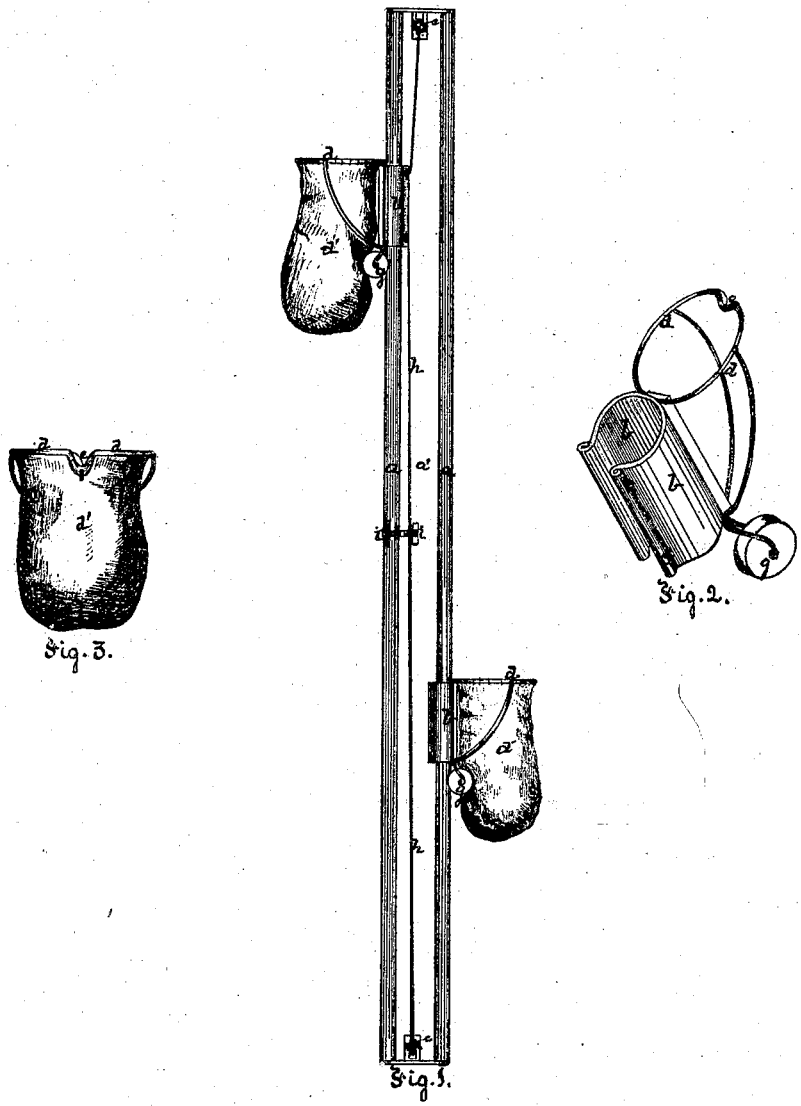

WALTER L. SHAW, OF ETNA, PENNSYLVANIA.

IMPROVEMENT IN FRUIT-PICKERS.

Specification forming part of Letters Patent No. 111,009, dated January 17, 1871.

*To all whom it may concern:*

Be it known that I, WALTER L. SHAW, of Etna, in the county of Allegheny and State of Pennsylvania, have invented a new and useful Improvement in Fruit-Pickers; and I do hereby declare the following to be a full, clear, and exact description thereof, reference being had to the accompanying drawings, making a part of this specification, in which—

Figure 1 is a side view of my improved fruit-picker, and Fig. 2 is an enlarged perspective view of one of the slides and of the basket or pouch frame attached thereto; and Fig. 3 is a front view of pouch and basket-frame.

Like letters of reference indicate like parts in each.

My improvement relates to the construction of improved devices for picking and gathering fruit, in which are employed a frame-work, having two parallel guiding-rods, on each of which is a slide carrying a basket, bag, or pouch with a knife-edge in the basket-frame, such slides being so connected with cords passing over pulleys that one basket can be lowered when full, and the other run up empty at the same time without bringing the frame-work to a horizontal position.

To enable others skilled in the art to make and use my improvement, I will proceed to describe its construction and mode of operation.

The side guiding-rolls, $a\,a$, of wood or metal, are connected together by a diaphragm, $a'$, or by cross-bars extending from one to the other. They are of sufficient length to enable the operator to reach up into the tree therewith to the fruit to be gathered. In each end of the diaphragm $a'$ is a small pulley, $c$, or, what is practically its equivalent, a sheave. A U-shaped slide, $b$, embraces each rod $a$, but so as to be run up and down each on its own rod. To each slide $b$ is attached a basket, bag, or pouch-frame, $d$, to which the bag $d'$ is attached, and in which is a V, $e$, with a knife-edge on one or both sides of the V, as shown. The knife is for cutting the stems of the fruit, and the bag $d'$ for receiving it as it falls, but it is made of such size and material as to prevent the bruising of the fruit.

To secure an easy movement of the slides $d$ and prevent their binding on the guides $a$ from the weight of the fruit, I arrange at the lower end of each slide a friction-roller, $g$, and so adjust it that it shall play against the outer face of its rod $a$ and prevent the lower end of its slide from too tightly engaging the rod. These slides are connected together by cords $h$, each of which passes over a pulley, $c$, so as practically to form an endless belt. Then by operating the cord $h$ as soon as one pouch $d'$ becomes full, it can be run down its rod or pole $a$ to be emptied, and at the same time and by the same operation the other is run up, and so on, filling and emptying alternately till all the fruit is gathered.

To keep the cords $h$ in place, I use clips $i$, which are fastened to the diaphragm $a'$ at only one end. The other end has a T-head, $i'$, which rests on the diaphragm or pole on the opposite side of the cord. That the slides $b$ may pass under these T-heads, I make the clips somewhat flexible, and curve the extremities of the T-heads outward a little, so that the slides $b$ in going up and down may pass under them.

The devices described may be made of light material, are easily used, and on account of the use of double pouches, which are alternately raised and lowered, they possess elements of utility not found, so far as I know, in any other fruit-picking device now in use.

What I claim as my invention, and desire to secure by Letters Patent, is—

1. A fruit-picker, consisting of two parallel guiding-rods, $a\,a$, slides $b\,b$, each carrying a pouch, bag, or basket and connected together by cords $h$, which pass over pulleys $c$, arranged and constructed substantially as described.

2. The slides $b$, each in combination with a pouch, $d'$, friction-roller $g$, and pole $a$, arranged substantially as set forth.

3. The devices of the first claim, in combination with the clips $i$, substantially as described.

4. In connection with a basket or pouch frame, $d$, and bag $d'$, a knife-edge arranged in a V in the frame, substantially as described.

In testimony whereof I, the said WALTER L. SHAW, have hereunto set my hand.

WALTER L. SHAW.

Witnesses:
 THOS. B. KERR,
 JOHN GLENN.